(12) United States Patent
Mukherjee et al.

(10) Patent No.: US 12,452,645 B2
(45) Date of Patent: Oct. 21, 2025

(54) COVERAGE BASED MACHINE TO MACHINE (M2M) SUBSCRIBER IDENTITY MODULE (SIM) DOWNLOAD

(71) Applicant: DISH Wireless L.L.C., Englewood, CO (US)

(72) Inventors: Prayash Mukherjee, Englewood, CO (US); Kevin Karlin, Englewood, CO (US); Sandeep Kulkarni, Englewood, CO (US); Eric Heib, Englewood, CO (US); Robert Urbanek, Overland Park, KS (US)

(73) Assignee: DISH Wireless L.L.C., Englewood, CO (US)

( * ) Notice: Subject to any disclaimer, the term of this patent is extended or adjusted under 35 U.S.C. 154(b) by 421 days.

(21) Appl. No.: 18/092,073

(22) Filed: Dec. 30, 2022

(65) Prior Publication Data

US 2024/0224024 A1 Jul. 4, 2024

(51) Int. Cl.
*H04W 8/20* (2009.01)
*H04W 4/70* (2018.01)
*H04W 8/18* (2009.01)

(52) U.S. Cl.
CPC ......... *H04W 8/205* (2013.01); *H04W 8/183* (2013.01); *H04W 4/70* (2018.02)

(58) Field of Classification Search
CPC ........ H04W 8/205; H04W 8/183; H04W 4/70
USPC ........................................... 455/419
See application file for complete search history.

(56) References Cited

U.S. PATENT DOCUMENTS

| | | | |
|---|---|---|---|
| 8,965,366 B1* | 2/2015 | Somayajula | H04W 60/00 |
| | | | 455/418 |
| 9,179,317 B2 | 11/2015 | Thill et al. | |
| 9,295,082 B2 | 3/2016 | Sennett et al. | |
| 10,171,968 B2 | 1/2019 | Ahluwalia et al. | |
| 10,334,428 B1 | 6/2019 | Chen et al. | |
| 10,476,671 B2 | 11/2019 | Park et al. | |
| 10,595,193 B2 | 3/2020 | Larignon et al. | |
| 10,721,616 B2 | 7/2020 | Yi et al. | |
| 2011/0294472 A1* | 12/2011 | Bramwell | H04W 8/04 |
| | | | 455/445 |
| 2015/0189459 A1 | 7/2015 | Aon et al. | |
| 2016/0353274 A1 | 12/2016 | Chichierchia | |
| 2017/0134444 A1* | 5/2017 | Buckley | H04L 9/3271 |
| 2018/0160294 A1 | 6/2018 | Lee et al. | |
| 2019/0181901 A1* | 6/2019 | Namiranian | H04L 63/08 |
| 2020/0008138 A1* | 1/2020 | Sasindran | H04W 76/10 |
| 2021/0084485 A1* | 3/2021 | Roy | H04W 12/35 |

(Continued)

*Primary Examiner* — Mark G. Pannell
(74) *Attorney, Agent, or Firm* — Fish & Richardson P.C.

(57) ABSTRACT

Methods, systems, and apparatus, including computer programs encoded on computer storage media, for downloading coverage based subscriber identity module (SIM) profiles. One of the methods includes receiving an order for a location-specific SIM profile for a user account. The method includes determining a coverage area associated with the user account, and determining the location-specific SIM profile for the user account based on the coverage area. The method includes receiving, from a machine to machine (M2M) SIM, a request to activate a mobile device that includes the M2M SIM, wherein the request comprises an identifier of the mobile device corresponding to the user account, and transmitting, to the mobile device, the location-specific SIM profile.

20 Claims, 4 Drawing Sheets

(56) References Cited

U.S. PATENT DOCUMENTS

2022/0167146 A1* 5/2022 Khanduri ................ H04W 4/50
2023/0413060 A1* 12/2023 Baskaran ............ H04L 63/0823

* cited by examiner

COVERAGE BASED MACHINE TO MACHINE (M2M) SUBSCRIBER IDENTITY MODULE (SIM) DOWNLOAD

BACKGROUND

Subscriber identity module (SIM) cards are used to connect a device to a wireless network. Machine to machine (M2M) SIM cards can be used to connect to internet of things (IoT) devices which might not have a user interface. The IoT devices can be controlled through the M2M SIM.

SUMMARY

In general, one innovative aspect of the subject matter described in this specification can be embodied in methods that include the actions of receiving, by at least one processing device, an order for a location-specific subscriber identity module (SIM) profile for a user account; determining, by the at least one processing device, a coverage area associated with the user account; determining, by the at least one processor, the location-specific SIM profile for the user account based on the coverage area; receiving, by the at least one processing device from a machine to machine (M2M) SIM, a request to activate a mobile device that includes the M2M SIM, wherein the request comprises an identifier of the mobile device corresponding to the user account; and transmitting, by the at least one processor and to the mobile device, the location-specific SIM profile.

One aspect of the present disclosure can be embodied in methods that include the actions of transmitting, from a M2M SIM installed on a mobile device, a request to register a mobile device, wherein the M2M SIM is configured to communicate with a mobile service platform providing wireless services using radio access network (RAN) resources of multiple wireless service providers, and wherein the request comprises an identifier corresponding to the mobile device; receiving, at the mobile device from the mobile service platform, a location-specific SIM profile configured to allow the mobile device to communicate with RAN resources of a particular wireless service provider of the multiple wireless service providers; installing the location-specific SIM on the mobile device; and initiating, by the mobile device using the location-specific SIM profile, a communication over the RAN resources of the particular wireless service provider.

Other embodiments of these aspects include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In particular, one embodiment includes all the following features in combination.

In some implementations, the order for the location-specific SIM profile is received from a device which is different than the mobile device.

In some implementations, determining the location-specific SIM profile includes selecting the location-specific SIM profile from a set of SIM profiles, wherein each SIM profile of the set of SIM profiles corresponds to a wireless service provider.

In some implementations, determining the location-specific SIM profile includes: determining that an initial SIM profile of the M2M SIM needs to be replaced; and responsive to determining that the initial SIM profile of the M2M SIM needs to be replaced, determining the location-specific SIM profile.

In some implementations, determining that an initial SIM profile of the M2M SIM needs to be replaced includes determining that an initial wireless service provider does not provide service in the coverage area.

In some implementations, the request to activate the mobile device is automatically transmitted by the M2M SIM in the mobile device without requiring any user action.

In some implementations, the methods can include the actions of transmitting instructions to cause the location-specific SIM profile to be set as a fallback profile of the M2M SIM; and transmitting instructions to cause an initial SIM profile to be deleted from the M2M SIM.

In some implementations, the methods can include the actions of receiving an indication of the location-specific SIM profile being installed at the mobile device.

In some implementations, receiving the indication of the location-specific SIM profile being installed includes: receiving, from the mobile device, a request to confirm that a connection is established between the location-specific SIM and a corresponding wireless service provider; and transmitting, to the mobile device, a response that confirms that the connection is established.

In some implementations, the methods can include the actions of responsive to receiving an inquiry from the M2M SIM regarding an availability of the location-specific SIM profile, determining that the location specific SIM profile is not available for download to the mobile device; and transmitting, to the mobile device, a message indicating that the location specific SIM profile is not available for download.

In some implementations, transmitting the request to register a mobile device is responsive to at least one of (i) a first network attachment (FNT) or (ii) a power cycle of the mobile device.

In some implementations, installing the location-specific SIM on the mobile device includes: setting the location-specific SIM profile as a fallback profile of the M2M SIM; and deleting an initial SIM profile from the M2M SIM.

In some implementations, initiating a communication over the RAN resources of the particular wireless service provider includes: transmitting, to the mobile service platform, a request to confirm that a connection is established between the location-specific SIM and the particular wireless service provider; and receiving a response that confirms that the connection is established.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform those operations or actions. That one or more computer programs is configured to perform particular operations or actions means that the one or more programs include instructions that, when executed by data processing apparatus, cause the apparatus to perform those operations or actions. That special-purpose logic circuitry is configured to perform particular operations or actions means that the circuitry has electronic logic that performs those operations or actions.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document describes technology that allows for a location-specific carrier subscriber identity module (SIM) profile to be downloaded on to a mobile device without requiring an initial SIM profile to be provisioned for the mobile device. When a mobile service platform supports multiple location-specific wireless service providers, the SIM profile that is activated for a particular user can depend on location (e.g., the registered address of the customer). Typically, when the customer first switches on a new device, the device accesses the mobile service platform to activate a cellular plan. The mobile service platform dynamically selects a SIM profile and a corresponding mobile network for the customer based on the network coverage of the area where the customer lives (e.g., based on information provided by the user during acquisition of the device). Without the advantage of the technology described herein, this can require an initial SIM profile to be pre-loaded on to the device, wherein the initial SIM profile is first registered during start-up to receive a communication (e.g., an SMS message) that initiates the download of the location-specific SIM profile to be ultimately used by the device. The initial SIM profile is then ported out and replaced by the location-specific SIM profile. This process can result in wastage of a phone number (e.g., the one that is assigned to the initial SIM profile). In addition, the process of porting out of the SIM profile and replacement by the new profile can itself have several drawbacks. For example, the transition process may be accompanied by a blackout period when cellular services are unavailable to the device, thereby affecting user experience. In addition, inaccurate synchronization among the various steps of the port-out/replacement process can lead to system failure where no SIM profile is properly provisioned on the device.

The technology described herein can address the issues described above by the use of a machine to machine (M2M) subscriber identity module (SIM) card in the mobile device of the customer. The M2M SIM card is configured with a bootstrap electronic profile which reaches out to the mobile service platform during start-up, for example, at first network attachment (FNA) and power cycles. The bootstrap electronic profile checks with the mobile service platform to determine if a SIM profile for the device (e.g., the location-specific SIM profile associated with a registered address of the customer) is ready for download. If the SIM profile is ready, the SIM profile is downloaded and installed on the mobile device. If the location-specific SIM profile is not available, the bootstrap profile can be configured to poll the mobile service platform intermittently until the SIM profile becomes available. Because the bootstrap profile of the M2M SIM card is configured to reach out to the mobile service platform at start-up, a separate phone number (otherwise needed to receive a message from the platform) need not be assigned to the profile, thereby saving a phone number from being redundantly assigned. In addition, because no initial SIM profile needs to be ported out, the problems associated with potential blackout periods may be mitigated, therefore improving overall user-experience. Further, the absence of a porting-out process obviates the chances of system failures resulting from any lack of synchronization in the steps of such a process.

Figure 1:
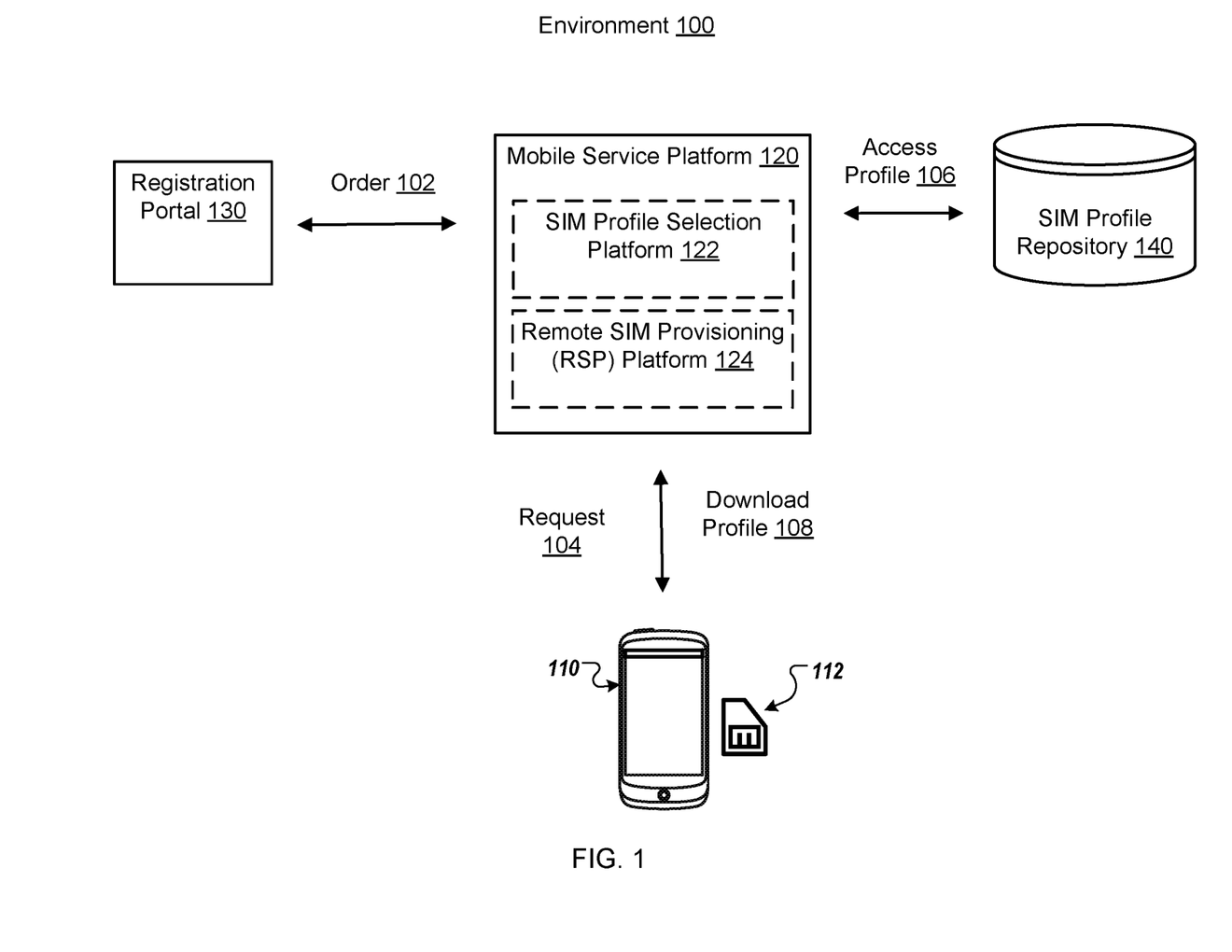
FIG. 1 is an example environment for downloading coverage based SIM profiles.

FIG. 1 is an example environment 100 for downloading coverage based SIM profiles. The environment 100 includes a mobile device 110 (i.e., UE) and a registration portal 130. A customer purchases a machine to machine (M2M) subscriber identity module (SIM) card 112 for the mobile device 110. For example, the M2M SIM card 112 can be installed in the mobile device 110 when the customer purchases the mobile device 110. In some examples, the customer can purchase the M2M SIM card 112 and insert the M2M SIM card 112 into the mobile device 110. In some examples, the M2M SIM card 112 can include an embedded universal integrated circuit card (EUICC), and a bootstrapped profile can be installed on the M2M SIM card 112 using an application on the mobile device 110. The customer uses the registration portal 130 to create a user account, subscribe to a cellular plan corresponding to the M2M SIM card 112, and activate the cellular plan. In some examples, an employee (e.g., at a store, through online customer service) can access the registration portal 130 when the customer subscribes to the cellular plan. In some examples, the customer can subscribe to the cellular plan online and access the registration portal 130. The customer provides an address (e.g., home, billing) and integrated circuit card identifier (ICCID) of the M2M SIM 112 to the registration portal 130. In some embodiments, the customer provides additional information when subscribing to the cellular plan (e.g., billing information, credit card information, email address, existing phone number).

The environment 100 includes a mobile service platform 120. In some embodiments, the mobile service platform 120 can optionally include a SIM profile selection platform 122 and a remote SIM provisioning (RSP) platform 124. The mobile service platform 120 (e.g., the SIM profile selection platform 122) can receive an order 102 for a location-specific SIM profile for a user (e.g., customer) account from registration portal 130. The order 102 can include the integrated circuit card identifier (ICCID) of the M2M SIM. In some embodiments, the registration portal 130 is a webpage which is accessed from the mobile service platform 120. In some embodiments, the request to activate a cellular plan is received from a device which is different than the mobile device. For example, the request to activate a cellular plan can be received from a device at a store. The request can include the order for the location-specific SIM profile The mobile service platform 120 (e.g., the SIM profile selection platform 122) can determine a coverage area associated with the user account. The mobile service platform 120 can use the address included in the order 102 to determine the network coverage of the area where the customer lives. The mobile service platform 120 can determine the location-specific SIM profile for the user account based on the coverage area. For example, the SIM profile selection platform 122 can determine which wireless network has the best (e.g., most complete, highest bandwidth) coverage of the coverage area (e.g., the area where the customer lives). The mobile service platform 120 can determine the location-specific SIM profile based on the wireless network with the best coverage of the area where the customer lives. For example, the SIM profile selection platform 122 can transmit coverage information to the RSP platform 124 in order to select a profile from a set of profiles stored at the SIM profile repository 140. The mobile service platform 120 (e.g., the RSP platform 124) can access the selected profile from the SIM profile repository 140 (106). In some embodiments, each SIM profile stored at the SIM profile repository 140 can correspond to a wireless service provider. For example, the SIM profile repository 140 can store SIM profiles which are configured to connect to different wireless networks.

The mobile service platform 120 (e.g., the RSP platform 124) can prepare the location-specific SIM profile for download to the mobile device 110. The mobile service platform 120 can communicate with the wireless service provider corresponding to the selected location-specific SIM profile and provision the SIM profile for the customer before the SIM profile is downloaded to the mobile device 110. When the location-specific SIM profile is ready for download, the mobile service platform 120 can send a notification to the customer (e.g., through an email address provided by the customer).

The mobile device 110 can transmit a request 104 request to register the mobile device 110. The mobile device 110 can use the M2M SIM card 112 installed on a mobile device to transmit the request to the mobile service platform 120 (e.g., the RSP platform 124). The request 104 can include a request for the location-specific SIM profile from the mobile service platform 120. In some embodiments, the request includes an identifier (e.g., ICCID of the M2M SIM, embedded ID (EID) corresponding to the mobile device 110). A bootstrap electronic profile can be installed on the M2M SIM card 112 which can establish a communication channel with a wireless network to reach out to the mobile service platform 120. The bootstrap electronic profile does not require a phone number to communicate with the mobile service platform 120. The M2M SIM card 112 can be configured to communicate with a mobile service platform providing wireless services using radio access network (RAN) resources of multiple wireless service providers.

In some embodiments, the request 104 to activate the mobile device 110 is automatically transmitted by the M2M SIM card 112 in the mobile device 110 without requiring any user action. For example, the M2M SIM card 112 can be used to control the mobile device 110 without using a user interface of the mobile device 110.

The mobile device 110 can transmit the request 104 at first network attachment (FNA) and power cycles of the mobile device (e.g., when the mobile device 110 is turned on after the M2M SIM card 112 is inserted). The mobile service platform 120 (e.g., the RSP platform 124) can receive the request 104 to activate the mobile device 110 that includes the M2M SIM card 112. The request 104 can be received from the M2M SIM card 112. In some embodiments, the request 104 includes an identifier of the mobile device corresponding to the user account.

In some embodiments, the mobile service platform 120 can determine whether an initial SIM profile (e.g., bootstrap electronic profile) of the M2M SIM card 112 needs to be replaced. For example, the bootstrap electronic profile installed on the M2M SIM 112 can be configured communicate with an initial wireless service provider. The mobile service platform 120 can determine whether the initial wireless service provider provides service in the coverage area of the customer's address. When the initial wireless service provider provides service in the coverage area, the mobile service platform 120 can provision the initial SIM profile for use with the initial wireless service provider. The mobile service platform 120 can transmit a message to the M2M SIM card 112 to use the bootstrap electronic profile as the location-specific SIM profile. When the initial wireless service provider does not provide service in the coverage area, the mobile service platform 120 can determine that the initial SIM profile of the M2M SIM card 112 needs to be replaced. The mobile service platform 120 can then determine the location-specific SIM profile. If the location-specific SIM profile is ready, the M2M SIM card 112 downloads the location-specific SIM profile.

The mobile service platform 120 (e.g., the RSP platform 124) can receive an inquiry from the M2M SIM card 112 regarding an availability of the location-specific SIM profile. The mobile service platform 120 can determine whether the location specific SIM profile is available for download to the mobile device 110. When the location specific SIM profile is not available for download, the mobile service platform 120 can transmit a message indicating that the location specific SIM profile is not available for download to the mobile device 110. For example, when a customer turns on the mobile device 110 with the M2M SIM 112 before the location specific SIM profile is available for download (e.g., before the customer has activated their account), the mobile service platform 120 cannot provide the location specific SIM profile. In some examples, the customer may have activated their account, but the mobile service platform 120 may not have finished provisioning the location specific SIM profile. In some embodiments, the mobile service platform 120 transmits a message to the M2M SIM 112 indicating that the customer account has not been activated.

In some implementations, when the location specific SIM profile is not available for download, the M2M SIM 112 can continue to periodically (e.g., every five minutes, every hour) poll the mobile service platform 120 for the location specific SIM profile until the location specific SIM profile becomes available. In some embodiments, the M2M SIM 112 can stop polling after a predetermined duration and require a user action (e.g., restarting the mobile device 110) in order to begin polling again. After the customer activates the account and the mobile service platform completes the provisioning of the location specific SIM profile, the location specific SIM profile can be transmitted to the M2M SIM 112 in response to the next polling request. When the location-specific SIM profile is activated correctly (e.g., downloaded, installed, activated, and a connection established), the mobile device 110 can disable the polling function in order to stop transmitting inquiries to the mobile service platform 120.

The mobile device 110 can download the location-specific SIM profile (108) from the mobile service platform 120 (e.g., the RSP platform 124). In order to download the location-specific SIM profile, the mobile service platform 120 can transmit the location-specific SIM profile and the mobile device 110 can receive the location-specific SIM profile. The location-specific SIM profile can be configured to allow the mobile device 110 to communicate with RAN resources of a particular wireless service provider of the multiple wireless service providers.

The mobile device 110 can install the location-specific SIM on the M2M SIM card 112. In some embodiments, the mobile service platform 120 can transmit instructions to the mobile device 110 to cause the mobile device 110 to set the location-specific SIM profile as a fallback profile of the M2M SIM card 112. In some embodiments, the mobile service platform 120 can transmit instructions to the mobile device 110 to cause the mobile device 110 to delete an initial SIM profile from the M2M SIM card 112.

The mobile device 110 and mobile service platform 120 can perform a check that the location-specific SIM profile activated correctly. The mobile device 110 can use the location-specific SIM profile to initiate a communication over the RAN resources of the particular wireless service provider. The communication can indicate that the location-specific SIM profile is installed at the mobile device 110, and can be received by the mobile service platform 120. In some embodiments, the mobile device 110 can transmit a request to the mobile service platform 120 to confirm that a connection is established between the location-specific SIM and the particular wireless service provider. The mobile service platform 120 can receive the request to confirm that the connection is established between the location-specific SIM and a corresponding wireless service provider, and transmit a response that confirms that the connection is established. The mobile device 110 can receiving the response that confirms that the connection is established in order to complete the check on both the mobile device 110 and mobile service platform 120.

Figure 2:
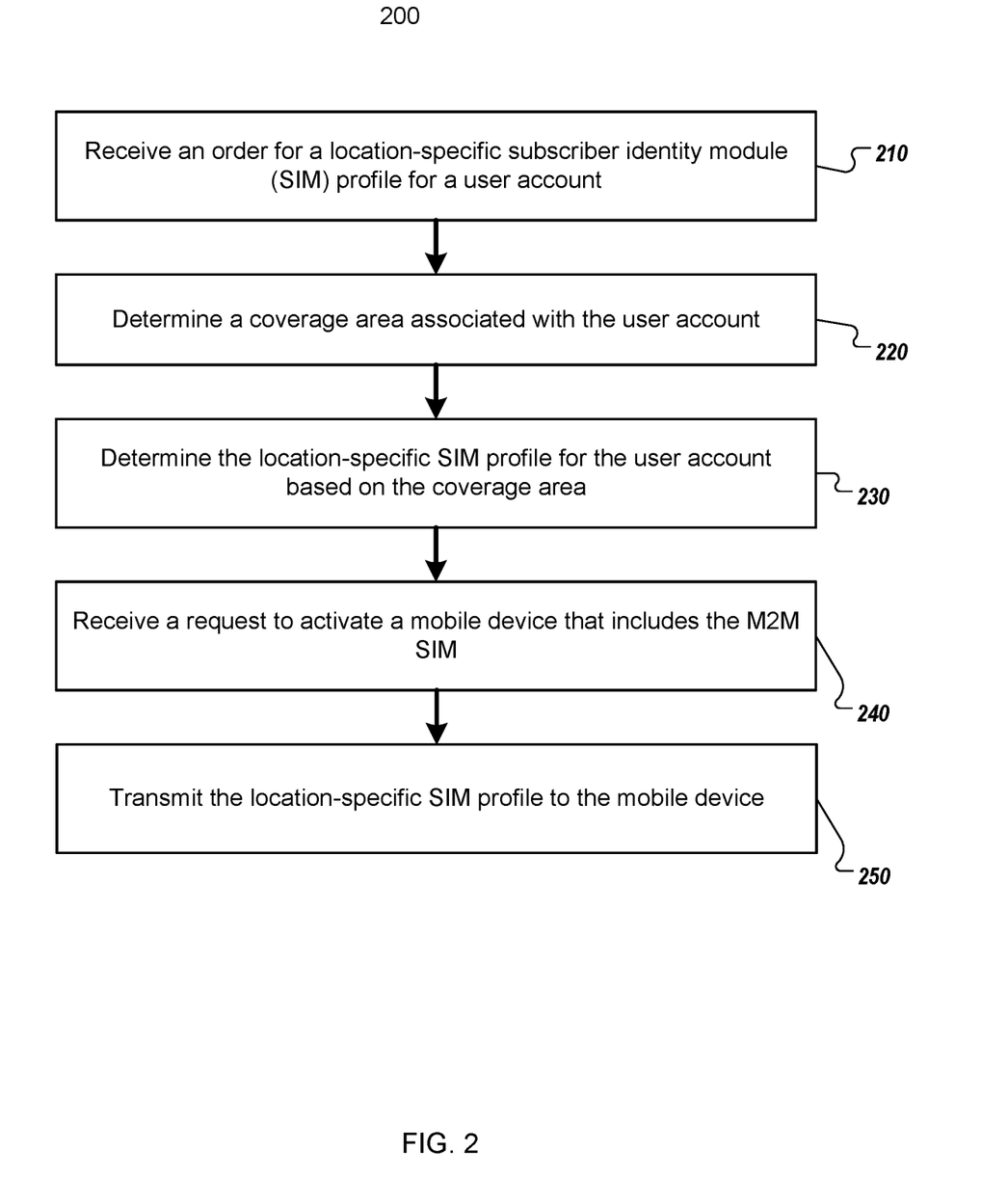
FIG. 2 is a flow diagram of an example process for determining coverage based SIM profiles.

FIG. 2 is a flow diagram of an example process 200 for determining coverage based SIM profiles. For example, the process 200 can be used by the mobile service platform 120 from the environment 100. The mobile service platform receives an order for a location-specific subscriber identity module (SIM) profile for a user account (210). In some embodiments, the order for the location-specific SIM profile is received through a portal. The order can be received from a device which is different than a mobile device which the location-specific SIM profile is ordered for.

The mobile service platform determines a coverage area associated with the user account (220). For example, RSP platform can determine the coverage area around an address (e.g., home address) corresponding to the user account.

The mobile service platform determines the location-specific SIM profile for the user account based on the coverage area (230). The mobile service platform can select the location-specific SIM profile from a set of SIM profiles. Each of the SIM profiles in the set of SIM profiles can correspond to a wireless service provider. In some embodiments, the mobile service platform can determine that an initial SIM profile of the M2M SIM needs to be replaced. In some embodiments, the mobile service platform can determine that an initial wireless service provider does not provide service in the coverage area. The mobile service platform can determine the location-specific SIM profile responsive to determining that the initial SIM profile of the M2M SIM needs to be replaced.

The mobile service platform receives a request to activate a mobile device that includes the M2M SIM (240). The request can be received from the M2M SIM. In some embodiments, the request includes an identifier of the mobile device corresponding to the user account. In some embodiments, the request to activate the mobile device is automatically transmitted by the M2M SIM in the mobile device without requiring any user action The mobile service platform transmits the location-specific SIM profile to the mobile device (250). In some embodiments, the mobile service platform can transmit instructions to cause the location-specific SIM profile to be set as a fallback profile of the M2M SIM. In such embodiments, the mobile service platform can transmit instructions to cause an initial SIM profile to be deleted from the M2M SIM.

Figure 3:
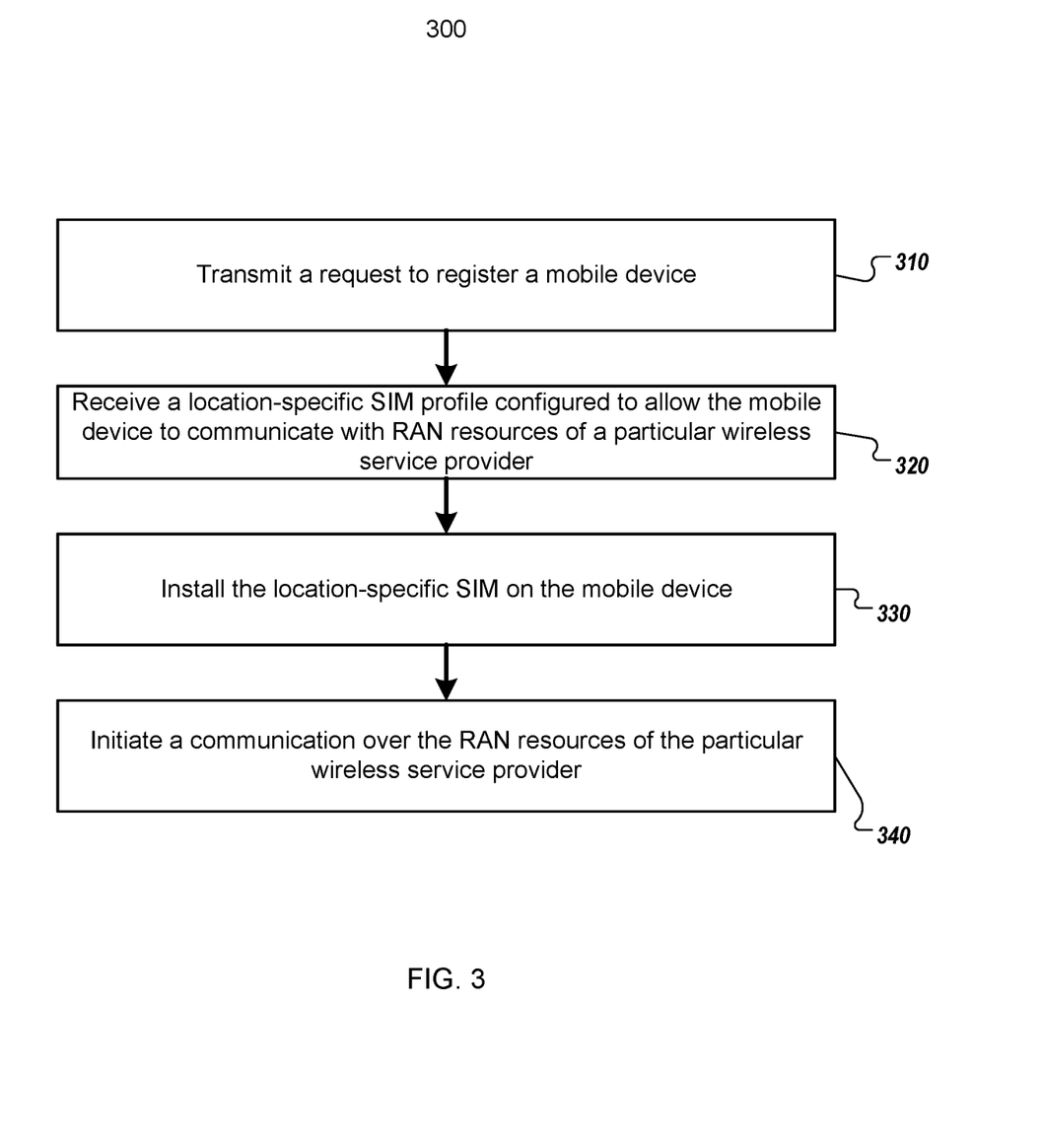
FIG. 3 is a flow diagram of an example process for downloading a coverage based SIM profile.

FIG. 3 is a flow diagram of an example process 300 for downloading a coverage based SIM profile. For example, the process 300 can be used by the mobile device 110 from the environment 100. In some examples, the process 300 can be used by the M2M SIM card 112 from the environment 100. The mobile device transmits a request to register the mobile device (310). The request can be transmitted from a M2M SIM installed on a mobile device. The M2M SIM can be configured to communicate with a mobile service platform providing wireless services using radio access network (RAN) resources of multiple wireless service providers. The request can include an identifier corresponding to the mobile device. In some embodiments, the mobile device can transmit the request to register the mobile device responsive to at least one of (i) a first network attachment (FNT) or (ii) a power cycle of the mobile device.

The mobile device receives a location-specific SIM profile configured to allow the mobile device to communicate with RAN resources of a particular wireless service provider of the multiple wireless service providers (320). The location-specific SIM profile can be received from the mobile service platform.

The mobile device installs the location-specific SIM on the mobile device (330). In some embodiments, the mobile device can set the location-specific SIM profile as a fallback profile of the M2M SIM. In some embodiments, the mobile device can delete an initial SIM profile from the M2M SIM.

The mobile device initiates a communication over the RAN resources of the particular wireless service provider (340). The mobile device can initiate the communication using the location-specific SIM profile. In some embodiments, the mobile device can transmit a request to confirm that a connection is established between the location-specific SIM and the particular wireless service provider. The mobile device can transmit the request to the mobile service platform. In some embodiments, the mobile device can receive a response that confirms that the connection is established.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an Hypertext Markup Language (HTML) page, to a user device, e.g., for purposes of displaying data to and receiving user input from a user interacting with the user device, which acts as a client. Data generated at the user device, e.g., a result of the user interaction, can be received from the user device at the server.

Figure 4:
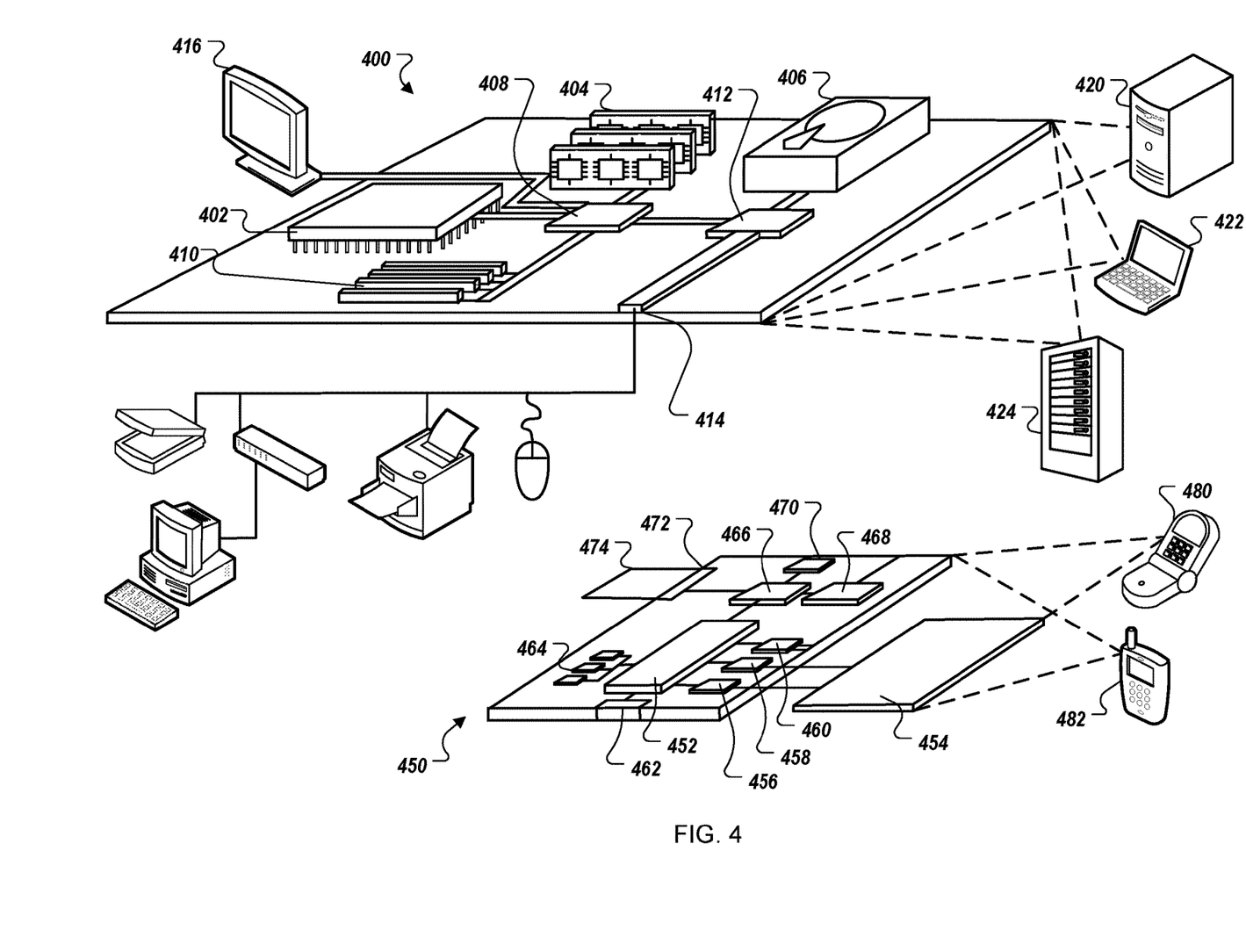
FIG. 4 is a block diagram of a computing system that can be used in connection with computer-implemented methods described in this specification.

FIG. 4 shows an example of a computing device 400 and a mobile computing device 450 (also referred to herein as a wireless device) that are employed to execute implementations of the present disclosure. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smartphones, AR devices, and other similar computing devices. The components shown here, their connections and relationships, and their functions, are meant to be examples only, and are not meant to be limiting. The computing device 400 and/or the mobile computing device 450 can form at least a portion of the application installation environment described above. For example, a computing device 400, or a portion thereof, can be used to implement the mobile service platform 120, the registration portal 130, and/or the SIM profile repository 140. The mobile device 110 described with reference to FIG. 1 can be substantially similar to the mobile computing device 450.

The computing device 400 includes a processor 402, a memory 404, a storage device 406, a high-speed interface 408, and a low-speed interface 412. In some implementations, the high-speed interface 408 connects to the memory 404 and multiple high-speed expansion ports 410. In some implementations, the low-speed interface 412 connects to a low-speed expansion port 414 and the storage device 404. Each of the processor 402, the memory 404, the storage device 406, the high-speed interface 408, the high-speed expansion ports 410, and the low-speed interface 412, are interconnected using various buses, and may be mounted on a common motherboard or in other manners as appropriate. The processor 402 can process instructions for execution within the computing device 400, including instructions stored in the memory 404 and/or on the storage device 406 to display graphical information for a graphical user interface (GUI) on an external input/output device, such as a display 416 coupled to the high-speed interface 408. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of a computer-readable medium, such as a magnetic or optical disk.

The storage device 406 is capable of providing mass storage for the computing device 400. In some implementations, the storage device 406 may be or include a computer-readable medium, such as a floppy disk device, a hard disk device, an optical disk device, a tape device, a flash memory, or other similar solid-state memory device, or an array of devices, including devices in a storage area network or other configurations. Instructions can be stored in an information carrier. The instructions, when executed by one or more processing devices, such as processor 402, perform one or more methods, such as those described above. The instructions can also be stored by one or more storage devices, such as computer-readable or machine-readable mediums, such as the memory 404, the storage device 406, or memory on the processor 402.

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards. In the implementation, the low-speed interface 412 is coupled to the storage device 406 and the low-speed expansion port 414. The low-speed expansion port 414, which may include various communication ports (e.g., Universal Serial Bus (USB), Bluetooth, Ethernet, wireless Ethernet) may be coupled to one or more input/output devices. Such input/output devices may include a scanner, a printing device, or a keyboard or mouse. The input/output devices may also be coupled to the low-speed expansion port 414 through a network adapter. Such network input/output devices may include, for example, a switch or router.

The computing device 400 may be implemented in a number of different forms, as shown in the FIG. 4. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device, such as a mobile computing device 450. Each of such devices may contain one or more of the computing device 400 and the mobile computing device 450, and an entire system may be made up of multiple computing devices communicating with each other.

The mobile computing device 450 includes a processor 452; a memory 464; an input/output device, such as a display 454; a communication interface 466; and a transceiver 468; among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate. In some implementations, the mobile computing device 450 may include a camera device(s) (not shown).

The processor 452 can execute instructions within the mobile computing device 450, including instructions stored in the memory 464. The processor 452 may be implemented as a chipset of chips that include separate and multiple analog and digital processors. For example, the processor 452 may be a Complex Instruction Set Computers (CISC) processor, a Reduced Instruction Set Computer (RISC) processor, or a Minimal Instruction Set Computer (MISC) processor. The processor 452 may provide, for example, for coordination of the other components of the mobile computing device 450, such as control of user interfaces (UIs), applications run by the mobile computing device 450, and/or wireless communication by the mobile computing device 450.

The processor 452 may communicate with a user through a control interface 458 and a display interface 456 coupled to the display 454. The display 454 may be, for example, a Thin-Film-Transistor Liquid Crystal Display (TFT) display, an Organic Light Emitting Diode (OLED) display, or other appropriate display technology. The display interface 456 may include appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a Single in Line Memory Module (SIMM) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provided as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. The instructions, when executed by one or more processing devices, such as processor 452, perform one or more methods, such as those described above. The instructions can also be stored by one or more storage devices, such as one or more computer-readable or machine-readable mediums, such as the memory 464, the expansion memory 474, or memory on the processor 452. In some implementations, the instructions can be received in a propagated signal, such as, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as Global System for Mobile communications (GSM) voice calls, Short Message Service (SMS), Enhanced Messaging Service (EMS), Multimedia Messaging Service (MMS) messaging, code division multiple access (CDMA), time division multiple access (TDMA), Personal Digital Cellular (PDC), Wideband Code Division Multiple Access (WCDMA), CDMA2000, General Packet Radio Service (GPRS). Such communication may occur, for example, through the transceiver 468 using a radio frequency. In addition, short-range communication, such as using a Bluetooth or Wi-Fi, may occur. In addition, a Global Positioning System (GPS) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in FIG. 4. For example, it may be implemented in the mobile device described with respect to FIGS. 1-3. Other implementations may include a phone device 482 and a tablet device 484. The mobile computing device 450 may also be implemented as a component of a smart-phone, personal digital assistant, AR device, or other similar mobile device.

Computing device 400 and/or 450 can also include USB flash drives. The USB flash drives may store operating systems and other applications. The USB flash drives can include input/output components, such as a wireless transmitter or USB connector that may be inserted into a USB port of another computing device.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims, described in the specification, or depicted in the figures can be performed in a different order and still achieve desirable results. In some cases, multitasking and parallel processing may be advantageous.

What is claimed is:

1. A method comprising:
  receiving, by at least one processing device, an order for a location-specific subscriber identity module (SIM) profile for a user account;
  determining, by the at least one processing device, a coverage area associated with the user account;
  determining, by the at least one processing device, the location-specific SIM profile for the user account based on the coverage area;
  receiving, by the at least one processing device from a machine to machine (M2M) SIM, a request to activate a mobile device that includes the M2M SIM, wherein the request comprises an identifier of the mobile device corresponding to the user account; and
  transmitting, by the at least one processing device and to the mobile device, the location-specific SIM profile.

2. The method of claim 1, wherein the order for the location-specific SIM profile is received from a device which is different than the mobile device.

3. The method of claim 1, wherein determining the location-specific SIM profile comprises selecting the location-specific SIM profile from a set of SIM profiles, wherein each SIM profile of the set of SIM profiles corresponds to a wireless service provider.

4. The method of claim 1, wherein determining the location-specific SIM profile comprises:
    determining that an initial SIM profile of the M2M SIM needs to be replaced; and
    responsive to determining that the initial SIM profile of the M2M SIM needs to be replaced, determining the location-specific SIM profile.

5. The method of claim 4, wherein determining that an initial SIM profile of the M2M SIM needs to be replaced comprises determining that an initial wireless service provider does not provide service in the coverage area.

6. The method of claim 1, wherein the request to activate the mobile device is automatically transmitted by the M2M SIM in the mobile device without requiring any user action.

7. The method of claim 1, further comprising:
    transmitting instructions to cause the location-specific SIM profile to be set as a fallback profile of the M2M SIM; and
    transmitting instructions to cause an initial SIM profile to be deleted from the M2M SIM.

8. The method of claim 1, further comprising receiving an indication of the location-specific SIM profile being installed at the mobile device.

9. The method of claim 8, wherein receiving the indication of the location-specific SIM profile being installed comprises:
    receiving, from the mobile device, a request to confirm that a connection is established between the location-specific SIM profile and a corresponding wireless service provider; and
    transmitting, to the mobile device, a response that confirms that the connection is established.

10. The method of claim 1, further comprising:
    responsive to receiving an inquiry from the M2M SIM regarding an availability of the location-specific SIM profile, determining that the location specific SIM profile is not available for download to the mobile device; and
    transmitting, to the mobile device, a message indicating that the location specific SIM profile is not available for download.

11. A system comprising:
    one or more processors; and
    one or more non-transitory storage devices storing instructions that are operable, when executed by the one or more processors, to cause the one or more processors to perform operations comprising:
        receiving an order for a location-specific subscriber identity module (SIM) profile for a user account;
        determining a coverage area associated with the user account;
        determining the location-specific SIM profile for the user account based on the coverage area;
        receiving, from a machine to machine (M2M) SIM, a request to activate a mobile device that includes the M2M SIM, wherein the request comprises an identifier of the mobile device corresponding to the user account; and
        transmitting, to the mobile device, the location-specific SIM profile.

12. The system of claim 11, wherein the order for the location-specific SIM profile is received from a device which is different than the mobile device.

13. The system of claim 11, wherein determining the location-specific SIM profile comprises selecting the location-specific SIM profile from a set of SIM profiles, wherein each SIM profile of the set of SIM profiles corresponds to a wireless service provider.

14. The system of claim 11, wherein determining the location-specific SIM profile comprises:
    determining that an initial SIM profile of the M2M SIM needs to be replaced; and
    responsive to determining that the initial SIM profile of the M2M SIM needs to be replaced, determining the location-specific SIM profile.

15. The system of claim 14, wherein determining that an initial SIM profile of the M2M SIM needs to be replaced comprises determining that an initial wireless service provider does not provide service in the coverage area.

16. The system of claim 11, wherein the request to activate the mobile device is automatically transmitted by the M2M SIM in the mobile device without requiring any user action.

17. The system of claim 11, wherein the operations further comprise:
    transmitting instructions to cause the location-specific SIM profile to be set as a fallback profile of the M2M SIM; and
    transmitting instructions to cause an initial SIM profile to be deleted from the M2M SIM.

18. The system of claim 11, wherein the operations further comprise receiving an indication of the location-specific SIM profile being installed at the mobile device.

19. The system of claim 18, wherein receiving the indication of the location-specific SIM profile being installed comprises:
    receiving, from the mobile device, a request to confirm that a connection is established between the location-specific SIM profile and a corresponding wireless service provider; and
    transmitting, to the mobile device, a response that confirms that the connection is established.

20. One or more non-transitory computer storage media encoded with computer program instructions that when executed by one or more computers cause the one or more computers to perform operations comprising:
    receiving an order for a location-specific subscriber identity module (SIM) profile for a user account;
    determining a coverage area associated with the user account;
    determining the location-specific SIM profile for the user account based on the coverage area;
    receiving, from a machine to machine (M2M) SIM, a request to activate a mobile device that includes the M2M SIM, wherein the request comprises an identifier of the mobile device corresponding to the user account; and
    transmitting, to the mobile device, the location-specific SIM profile.

* * * * *